July 16, 1935.  E. S. DOUGLAS  2,008,065
SAMPLING AND TESTING DEVICE FOR COFFEE AND THE LIKE
Filed Dec. 18, 1934  2 Sheets-Sheet 1

Inventor
Edward S. Douglas
By
Eccleston & Eccleston
Attorneys

July 16, 1935.  E. S. DOUGLAS  2,008,065
SAMPLING AND TESTING DEVICE FOR COFFEE AND THE LIKE
Filed Dec. 18, 1934  2 Sheets-Sheet 2
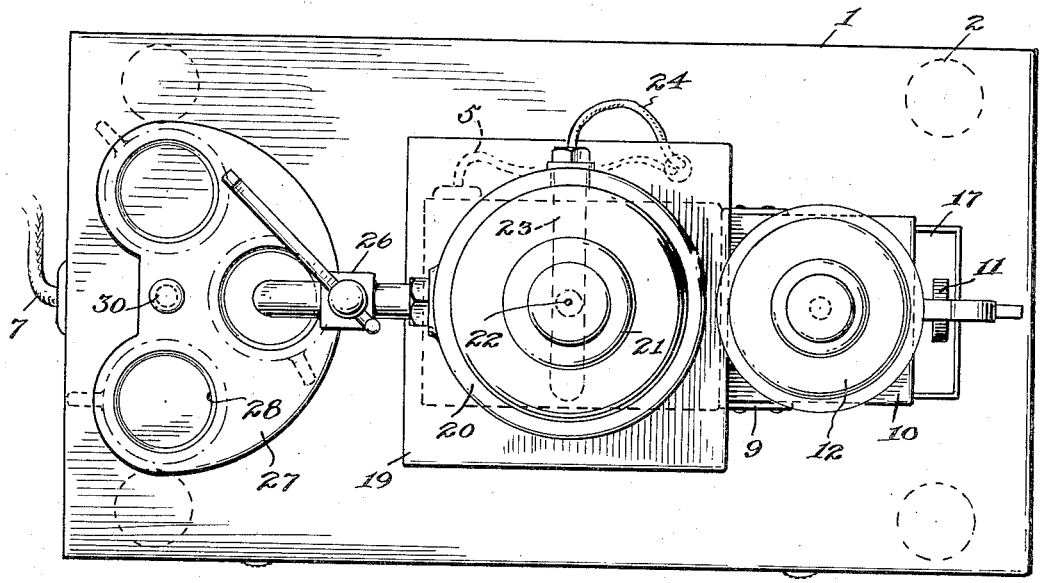
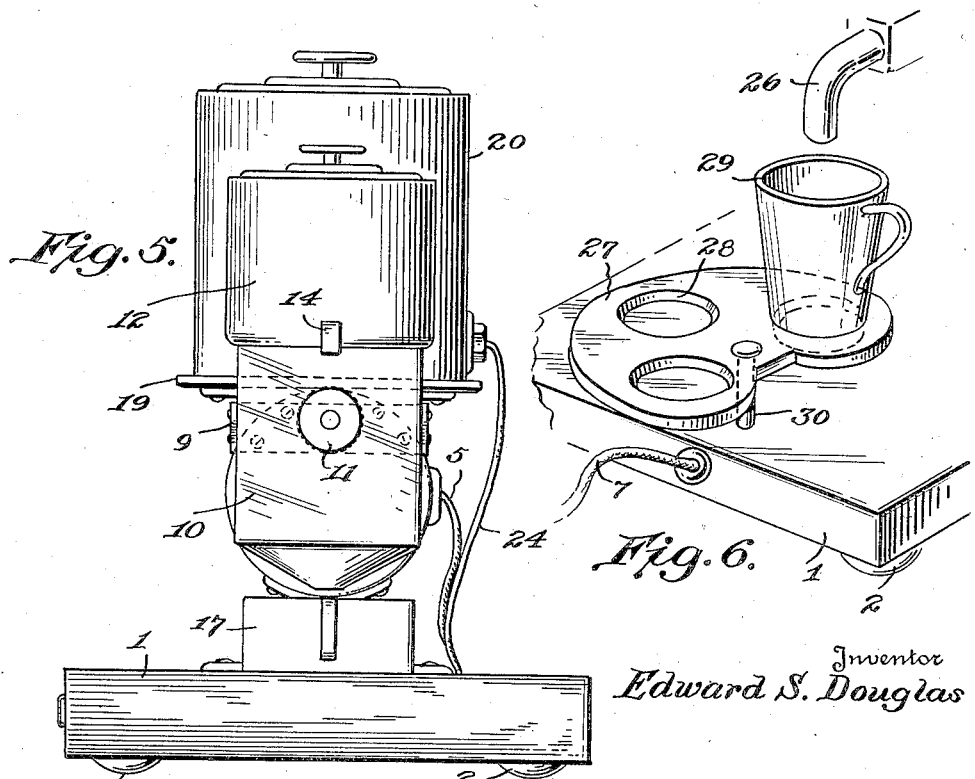
Inventor
Edward S. Douglas
By Eccleston & Eccleston,
Attorneys Patented July 16, 1935

2,008,065

UNITED STATES PATENT OFFICE 2,008,065

SAMPLING AND TESTING DEVICE FOR COFFEE AND THE LIKE

Edward S. Douglas, Chicago, Ill., assignor to Jules A. Schlinger, Connellsville, Pa.

Application December 18, 1934, Serial No. 758,134

4 Claims. (Cl. 53—3)

This invention relates to a sampling and testing device for coffee and similar beverages, such as tea, cocoa, and the like, and has for its primary object to provide a unitary and compact device of this nature of relatively small dimensions which may be readily carried in a corner of a salesman's case.

Another object of the invention resides in the provision of a testing device which will permit of the preparation of samples of several different brands or grades of coffee or the like in rapid succession so as to provide an accurate comparison of the flavor and aroma of the different products.

A further object of the invention consists in providing a testing device in which the various elements necessary to the preparation of the samples are so arranged as to facilitate and expedite their preparation and thus provide a substantial aid in promoting the sale of the goods.

Another object of the invention resides in the provision of a testing device in which a pivoted stand is employed for supporting a plurality of the cups or containers used in conjunction with the device so as to enhance the usefulness of the tester.

Other objects and advantages of the invention will be apparent from the following description when taken in connection with the accompanying drawings, in which, Figure 1 is a side elevational view of the complete apparatus, parts being broken away.

Figure 4 is a plan view of the tester.

Figure 5 is an end view looking in the opposite direction from Figure 2, and

Figure 6 is an enlarged detail view of the pivoted stand and related parts.

Figure 1:
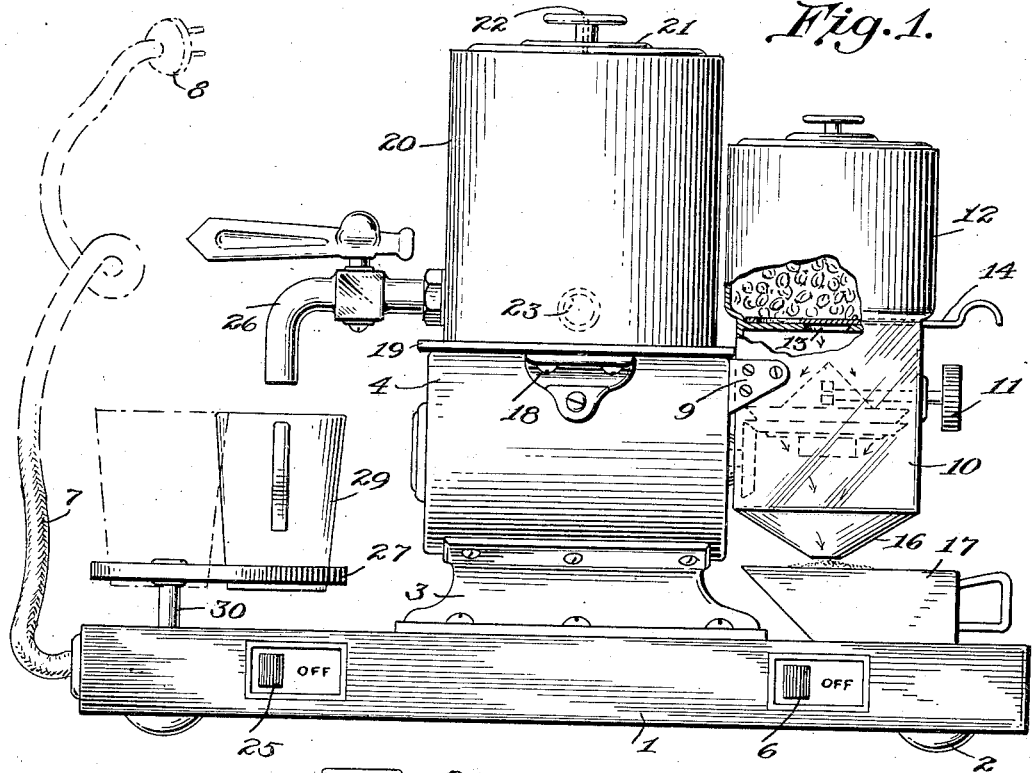
Figures 2, 3:
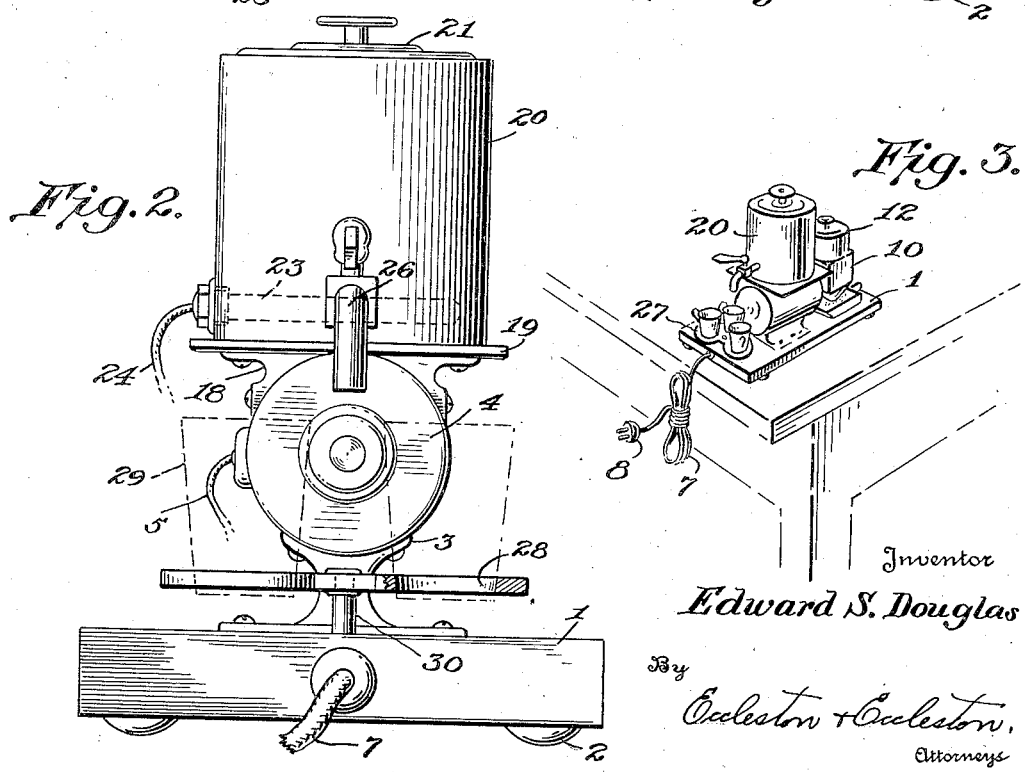
Figure 2 is an end view of the apparatus.
Figure 3 is a perspective view of the device mounted on a table.

Referring to the drawings in greater detail, the numeral 1 indicates a base of insulation material and provided with knobs 2 on its underside to suitably space the base from the table or desk on which the tester may be placed for demonstrating the qualities of the goods being tested.

Mounted about midway of the length of the base 1, which as already intimated is of rather small dimensions, is a bracket 3 which supports a small electric motor 4. The motor is connected by electrical conductors 5 with a switch 6 mounted in the base 1, which is in turn connected to the service cable 7 provided with the usual connector plug 8.

Supported on an end of the casing of the motor 4, as by brackets 9, is a miniature coffee grinder 10 of any conventional construction, provided with an adjusting knob 11 to vary the fineness of the ground material.

Mounted above the mill 10 is a hopper 12 for receiving the material to be ground, and passage 13 and slide valve 14 provide for regulating the charge of material entering the mill. The grinding mechanism of the mill is suitably connected to the motor 4 through a bevel gear 15 or other desired means.

As will be obvious, the discharge funnel 16 of the coffee grinder is spaced above the base 1 so as to provide for positioning the container 17 between the funnel and base.

Mounted on the motor casing 4, as by means of brackets 18 and plate 19, is a hot water receptacle 20, provided with a closure 21 and steam vent 22. Detachably positioned in the receptacle 20 adjacent the bottom thereof is an electrical water heater 23 of any preferred construction, and wiring 24 connects the heater in circuit with a switch 25, which is in turn connected with the service cable 7.

A faucet 26 is connected to the hot water receptacle 20 adjacent its bottom and overhangs the adjacent end of base 1. Cooperating with the faucet 26 is a tray or stand 27 provided with a plurality of openings 28 for receiving sampling cups 29. This tray is pivoted to the base 30 as indicated by numeral 30, and the tray itself is struck on the arc of a circle so that the several cups supported thereon may be brought successively under the faucet by a pivotal movement about the center 30.

The structural details of the testing device having been fully described, the manner of its operation in comparing various brands of coffee or other beverages will now be stated.

The tester having been removed from the salesman's case and connected to the house current through plug 8, a charge of coffee or the like of any desired brand is placed in the mill, the receptacle 20 is filled with water, and both switches 6 and 25 closed. This closing of the circuits through the motor 4 and heater 23 will put both of these devices in operation so that the water is heating in receptacle 20 while the beverage material is being ground. The degree of fineness of the material is of course rendered variable by means of the adjusting member 11, and when so ground and discharged into the container 17, the switch 6 is opened and the container 17 removed. This member 17 serves as a ladle for distributing the ground material to one or more of the cups 29 as desired, and the hot water is of course charged into the cups by merely opening the faucet 26 and oscillating the tray 27 so as to bring the cups successively into cooperation therewith.

The samples of material thus placed in the cups may be stirred, treated with cream and sugar, or as desired by the prospective customer and then carefully examined as to its taste and aroma.

The several cups 27 may be all charged with the same brand of material if circumstances warrant. On the other hand, if found desirable, several different brands of material may be passed through the grinder in quick succession and charged into the various cups and tested by the prospective customer so that a more reliable comparison of the flavor and aroma of the brands may be obtained.

From the foregoing description and the attached drawings it will be apparent to those skilled in the art that the present invention provides a very compact and handy device for testing the merits of various brands of beverages; that the demonstration may be made in the presence of the customer in a neat and attractive manner; that the apparatus is so designed as to admit of a rapid preparation of samples of various brands so as to facilitate comparison, and that the entire device may be readily transported in a section of a conventional sales case.

In accordance with the patent statutes I have described what I now believe to be the preferred form of the invention, but inasmuch as various minor changes may be made in the details of construction without departing from the spirit of the invention it is intended that all such details be included within the scope of the appended claims.

What is claimed is:

1. A miniature device for the preparation of beverage samples and capable of placement in a salesman's case, said device including a base member, an electrically-operated mill and a separate, non-communicating electrically heated water receptacle on said base, a faucet connected to the receptacle, and means for supporting one or more cups below the faucet.

2. A miniature device for the preparation of beverage samples and capable of placement in a salesman's case, said device including a base member, a grinding mill mounted thereon, a removable receiving container for the mill, a separate, non-communicating hot water receptacle supported on the base member, a faucet connected to the receptacle, and a tray pivoted on a vertical axis for successively supporting a plurality of cups beneath the faucet.

3. A miniature device for the preparation of beverage samples and capable of placement in a salesman's case, said device including a base member, an electrically operated mill and a separate, non-communicating electrically heated water receptacle on said base, a removable receiving container for the mill, a faucet connected to the receptacle, and means for supporting one or more cups below the faucet.

4. A miniature device for the preparation of beverage samples and capable of placement in a salesman's case, said device including a base member, an electrically-operated mill and a separate, non-communicating electrically heated water receptacle on said base, electric switches mounted in the base member, and associated with the circuits of the mill and receptacle, a removable receiving container supported below the mill, and means for successively presenting a plurality of cups beneath the faucet.

EDWARD S. DOUGLAS.